United States Patent
Zhang et al.

(10) Patent No.: US 10,442,110 B2
(45) Date of Patent: *Oct. 15, 2019

(54) WOOD TREATMENT FOR DIMENSIONAL STABILIZATION

(71) Applicant: Koppers Performance Chemicals Inc., Pittsburgh, PA (US)

(72) Inventors: Jun Zhang, Peachtree City, GA (US); Xinhao H. Gao, Peachtree City, GA (US); John Horton, Peachtree City, GA (US); Richard Ziobro

(73) Assignee: Koppers Performance Chemicals Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/170,676

(22) Filed: Oct. 25, 2018

(65) Prior Publication Data

US 2019/0126506 A1 May 2, 2019

Related U.S. Application Data

(63) Continuation of application No. 15/327,534, filed as application No. PCT/US2015/042073 on Jul. 24, 2015, now Pat. No. 10,137,595.

(60) Provisional application No. 62/031,379, filed on Jul. 31, 2014.

(51) Int. Cl.
| | | |
|---|---|---|
| *B27K 3/50* | (2006.01) | |
| *C09D 201/06* | (2006.01) | |
| *B27K 3/08* | (2006.01) | |
| *B27K 3/36* | (2006.01) | |
| *B27K 3/02* | (2006.01) | |
| *B27K 3/15* | (2006.01) | |
| *C08G 18/48* | (2006.01) | |
| *C08G 18/64* | (2006.01) | |
| *C08L 33/02* | (2006.01) | |
| *C08L 33/04* | (2006.01) | |
| *C08L 63/00* | (2006.01) | |
| *C08L 71/00* | (2006.01) | |
| *C08L 71/02* | (2006.01) | |
| *C08L 75/00* | (2006.01) | |
| *C08L 97/02* | (2006.01) | |
| *C08L 91/00* | (2006.01) | |

(52) U.S. Cl.
CPC ............ *B27K 3/50* (2013.01); *B27K 3/0278* (2013.01); *B27K 3/08* (2013.01); *B27K 3/15* (2013.01); *B27K 3/153* (2013.01); *B27K 3/36* (2013.01); *C08G 18/4825* (2013.01); *C08G 18/6492* (2013.01); *C08L 33/02* (2013.01); *C08L 33/04* (2013.01); *C08L 63/00* (2013.01); *C08L 71/00* (2013.01); *C08L 71/02* (2013.01); *C08L 75/00* (2013.01); *C08L 97/02* (2013.01); *C09D 201/06* (2013.01); *B27K 2240/70* (2013.01); *C08L 91/005* (2013.01)

(58) Field of Classification Search
CPC .......... B27K 3/50; B27K 3/0278; B27K 3/08; B27K 3/15; B27K 3/153; B27K 3/36; C08L 33/02; C08L 33/04; C08L 63/00; C08L 71/00; C08L 71/02; C08L 75/00; C08L 97/02; C09G 18/4825; C09G 18/6492; C09D 201/06
USPC ........................................................ 428/541
See application file for complete search history.

(56) References Cited

U.S. PATENT DOCUMENTS

| | | | | |
|---|---|---|---|---|
| 3,967,011 A | * | 6/1976 | Dunn, Jr. ............. | B27K 3/0278 427/345 |
| 5,763,510 A | * | 6/1998 | Janeway ................ | C09D 15/00 524/102 |
| 2009/0266482 A1 | * | 10/2009 | Garmann ................ | C08G 18/12 156/275.5 |
| 2010/0096096 A1 | * | 4/2010 | Egiburu ................. | D21H 17/53 162/164.3 |

FOREIGN PATENT DOCUMENTS

| | | | |
|---|---|---|---|
| WO | WO2007/022114 | * | 2/2007 |
| WO | WO-2007022114 A2 | | 2/2007 |

OTHER PUBLICATIONS

International Search Report dated Dec. 8, 2015, issued in PCT/US2015/042073.
Written Opinion of the International Searching Authority dated Dec. 8, 2015, issued in PCT/US2015/042073.
Notification Concerning Transmittal of International Preliminary Report on Patentability (Chapter 1 of the Patent Cooperation Treaty), dated Feb. 9, 2017, issued in PCT/US2015/042073.
International Preliminary Report on Patentability, dated Jan. 31, 2017, issued in PCT/US2015/042073.

* cited by examiner

*Primary Examiner* — Leszek B Kiliman
(74) *Attorney, Agent, or Firm* — Covington + Burling LLP

(57) ABSTRACT

A process is provided for treating wood products including lumber, plywood and other engineered wood products comprising the steps of contacting a composition comprising a polypropylene glycol, a high molecular weight polyethylene glycol, a polyether polyol having low solubility in water, or a polytetrahydrofuran, or hydrophobic polyether polyol, with the wood product. The invention also provides wood products comprising a polypropylene glycol, a high molecular weight polyethylene glycol, a polyether polyol having low solubility in water, or a polytetrahydrofuran, or hydrophobic polyether polyol, that have greater dimensional stability compared to an untreated wood product.

57 Claims, No Drawings

WOOD TREATMENT FOR DIMENSIONAL STABILIZATION

CROSS REFERENCE TO RELATED APPLICATIONS

This application is a continuation of U.S. application Ser. No. 15/327,534, filed Jan. 19, 2017, which is a National Phase of Application No. PCT/US15/42073, filed Jul. 24, 2015, which claims priority to U.S. Provisional Application No. 62/031,379, filed Jul. 31, 2014, the contents of which are hereby incorporated by reference in their entirety.

FIELD OF THE INVENTION

This invention relates generally to the treatment of a wood product to improve the dimensional stability of wood and, more particularly, to dimensionally-stabilized wood comprising a polypropylene glycol, a high molecular weight polyethylene glycol, a polyether polyol having low solubility in water, or a polytetrahydrofuran, or hydrophobic polyether polyol.

BACKGROUND OF THE INVENTION

The main components of wood are cellulose, hemicellulose and lignin. Cellulose and hemicellulose are hydrophilic structures that contain hydroxyl groups. Hydroxyl groups interact with water molecules to form hydrogen bonds. Consequently, wood is capable of absorbing as much as 100% of its weight in water producing swelling. Evaporation leads to shrinkage. Because this natural water absorption/evaporation cycle occurs non-uniformly, this cycle creates internal stresses within the wood. These stresses cause the wood to check, split and warp.

Research activities to improve the dimensional stability of wood have spanned many decades. Various approaches have been attempted to reduce the affinity of wood for water, such as heat treatment, chemical and enzymatic modification of hydroxyl groups on cellulose or hemicellulose, or provision of a barrier coating (either external or internal).

Currently, three commercial processes are available to impart dimensional stability to wood—thermal treatment, acetylation and furfurylation. Thermal treatment will improve the dimensional stability of wood, however, it also will cause significant loss of mechanical strength. In softwoods, acetylation generally confers an anti-swelling efficiency (ASE) of about 75% with an associated weight increase of about 26% to 28%. Acetylation requires impregnation of acetic anhydride into wood prior to initiation of acetylation. The acetylation process will generate by-product acetic acid in the treated wood. As a result, post-treatment removal of acetic acid is required; however, residual acetic acid will remain in wood. The generation of acetic acid used during wood treatment requires stainless steel, corrosion-resistant treating equipment. In addition, residual acid in the treated wood product requires the use of stainless steel and corrosion-resistant metal fastener hardware. Acetylated wood is also extremely prone to mold growth when exposed to a moist environment. As a result, acetylated wood requires a surface protective coating or colorants if used in an outdoor condition. Furfurylation generally provides treated wood with an ASE of about 60% and a weight gain of about 30%. Furfurylation processes and furfulated wood release undesirable volatile organic compounds (VOC) during the curing process. In addition, furfurylation also results in increased brittleness of the wood. The characteristics, expense and complexity of these processes for enhancing the dimensional stability of wood limit the commercial usefulness of these processes.

Research on improved treatments for enhancing the dimensional stability of wood has included cell-wall bulking treatments. The deposition of bulking agents in wood can be achieved by impregnating non-reactive bulking agents into the wood or by impregnating monomers into the wood followed by polymerization of the monomers within the wood. The bulking agents can be water soluble or insoluble, reactive or non-reactive with wood components. The bulking agents known to those skilled in the art include polyethylene glycol (PEG), phenol, resorcinol, melamine and urea-formaldehydes, phenol furfural, furfuryl-analine and furfuryl alcohol and various vinyl resins such as polystyrene, polymethyl methacrylate, polyacrylonitrile, polyvinyl chloride with the help of wood swelling agents. With the exception of PEG, most bulking agents penetrate into wood but remain in the cell lumen. As a result, these bulking treatments may temporarily retard water absorption by wood, but do not provide long-term stabilization, because the hydroxyl groups in the wood cell wall remain unmodified and are consequently still available to absorb water molecules.

Polyether polyols are generally prepared by reacting epoxides, such as ethylene oxide, propylene oxide or tetrahydrofuran with initiator in the presence of catalyst(s). Common polyether diols are polyethylene glycol (PEG), polypropylene glycol (PPG), and poly(tetramethylene) glycol (also named polytetrahydrofuran or PTMEG). PEGs are generally water soluble, while PPG and PTMEG are water insoluble and can be pressure impregnated into wood.

Water-soluble polyethylene glycol (PEG) polymers have been widely used for treating wood to maintain and improve the dimensional stability of wood and wood products by preventing shrinkage, drying and cracking, and reducing warping. In addition, pre-soaking green wood in a PEG solution can allow kiln drying of green wood at high temperatures without causing cracking, splitting or warping. PEG (even high-molecular weight PEG), however, is highly water soluble and renders it unsuitable for long-term outdoor use, because water and moisture will facilitate the leaching of PEG out of the wood.

The present inventors have discovered that water insoluble polyether polyols, such as polypropylene glycol (PPG) polymer or copolymer, or poly (tetramethylene) glycol (also named polytetrahydrofuran) polymer or copolymer, once impregnated into a wood product, provides excellent wood dimensional stabilization and is less prone to water leaching from the treated wood product than PEG.

SUMMARY OF THE INVENTION

The present invention provides a method and composition for improving the dimensional stabilization of wood products. In certain embodiments, the method comprises contacting a wood product with a composition comprising a polypropylene glycol (PPG) polymer or a PPG co-polymer, a high molecular weight polyethylene glycol, a polyether polyol having low solubility in water, or a polytetrahydrofuran, or hydrophobic polyether polyol. In one embodiment, wood or wood product is impregnated with a polypropylene glycol compound or PPG co-polymer, or any of the polyols disclosed herein, by one or more pressure, vacuum or microwave methods. In another embodiment, the composition comprises a PPG or PPG co-copolymer in a solvent carrier. The PPG impregnated wood can optionally be applied by a surface coating or surface reactive agents that will react with the hydroxyl groups of PPG and/or wood.

The wood products produced by the methods of the present invention are produced by a method comprising the step of contacting a wood product with a composition comprising a PPG or PPG copolymer, a high molecular weight polyethylene glycol, a polyether polyol having low solubility in water, or a polytetrahydrofuran, or hydrophobic polyether polyol, that are either insoluble in water, have a solubility in water no greater than about 0.5% weight/weight or no greater than about 0.1% weight/weight at 25° C.; 0.2% weight/weight at 25° C.; 0.3% weight/weight at 25° C.; 0.4% weight/weight at 25° C.; 0.5% weight/weight at 25° C.; 0.6% weight/weight at 25° C.; 0.7% weight/weight at 25° C.; 0.8% weight/weight at 25° C.; 0.9% weight/weight at 25° C.; or 1.0% weight/weight at 25° C. and/or an average molecular weight of between at least 500 and 100,000; between at least 5,000 and 100,000; or between about at least 500 and 5,000. In certain embodiments, the average molecular weight of the polypropylene glycol is at least 2,000; 3,000; 4,000; 4,800; 5,000; 6,000; 7,000; 8,000 or 10,000. In another embodiment, the average molecular weight of the polypropylene glycol is less than about 5,000.

The compositions of PPG or PPG-copolymer, a high molecular weight polyethylene glycol, a polyether polyol having low solubility in water, or a polytetrahydrofuran, or hydrophobic polyether polyol, may be applied to the wood product by contacting the wood product with the composition at ambient or elevated temperature. In certain embodiments, the application or contacting of the composition with the wood or wood product comprises one or more of pressure, vacuum, or microwave treatments. The application or contacting steps may comprise a temperature step of between about 30° C. and 80° C.; between about 20 and 25° C.; between about 22 and 25° C.; or at least about 30° C. In certain embodiments, the temperature during the contacting step may vary from ambient temperature to elevated temperatures, such as above about 20° C., 30° C., 40° C., 50° C., 60° C., 70° C., 80° C., 90° C., 100° C., 110° C., 120° C., 130° C., 140° C. or 150° C.

In certain embodiments, the compositions used to treat a wood product consist of or consist essentially of a PPG or PPG copolymer with or without a carrier solvent. In other embodiments, the compositions used to treat a wood product further comprise drying agents, such as drying oils, and/or curing agents, such as isocyanate- and/or epoxy-based compounds. The contacting step of the invention disclosed herein may be conducted at ambient or elevated temperature. In some embodiments, following contacting the wood product with compositions comprising PPG or PPG copolymers, the wood product is treated with one or more surface agents and/or coatings. The agents/coatings can be reactive with hydroxyl groups of the PPG or PPG copolymer such as isocyanate, polyisocyanate, blocked polyisocyanate, thermolatent isocyanate, amino formaldehyde resin, polyanhydride, epoxy resin and carboxylated resin to form chemical bonds. The agents/coatings can also be non-reactive with PPG or PPG copolymer film forming resin/polymer such as polyester resins, vinyl ester resins, vinyl ester ethylene copolymers, acrylic resins, styrene/acrylic copolymers, styrene/butadiene copolymers and other synthetic and natural latexes; or crosslinking polymers such as epoxies and polyurethanes.

In certain embodiments, the compositions used to treat a wood product comprise polyether polyols having low solubility in water. The compositions may be formulated with or without a carrier solvent. Examples of such polyether polyols include, but are not limited to, high molecular weight polyethylene glycol (PEG), polytetrahydrofuran, and hydrophobic polyether polyols.

In general, as the molecular weight of polyols, such as polyethylene glycol (PEG), increases, the solubility of the polyol in water decreases. As the solubility in water of the polyols of the invention decrease, wood treated with these polyols are less prone to releasing the polyols into the environment via leaching.

As stated above, in certain embodiments, the compositions used to treat a wood product may comprise a high molecular weight polyethylene glycol (PEG) having low solubility in water. In certain embodiments of the invention, the PEG has an average molecular weight of at least about 4000; 5000; 6000; 7000; 8000; 9000; 10,000, 15,000; 20,000; 25,000; 30,000; 35,000; 40,000; 45,000; 50,000; 55,000; 60,000; 65,000; 70,000; 75,000; 80,000; 85,000; 90,000; 95,000; or 100,000.

In certain embodiments, the compositions used to treat a wood product may comprise a polytetrahydrofuran. In certain embodiments, the polytetrahydrofuran has an average molecular weight of at least about 100; 150; 200; 250; 300; 350; 400; 450; 500; 550; 600; 650; 700; 750; 800; 850; 900; 950; 1000; 1050; 1100; 1150; 1200; 1250; 1300; 1350; 1400; 1450; 1500; 1550; 1600; 1650; 1700; 1750; 1800; 1850; 1900; 1950; 2000; 2050; 2100; 2150; 2200; 2250; 2300; 2350; 2400; 2450; 2500; 2550; 2600; 2650; 2700; 2750; 2800; 2850; 2900; 2950; 3000; 3050; 3100; 3150; 3200; 3250; 3300; 3350; 3400; 3450; 3500; 3550; 3600; 3650; 3700; 3750; 3800; 3850; 3900; 3950; 4000; 4050; 4100; 4150; 4200; 4250; 4300; 4350; 4400; 4450; 4500; 4550; 4600; 4650; 4700; 4750; 4800; 4850; 4900; 4950; 5000; 5050; 5100; 5150; 5200; 5250; 5300; 5350; 5400; 5450; 5500; 5550; 5600; 5650; 5700; 5750; 5800; 5850; 5900; 5950; 6000; 6050; 6100; 6150; 6200; 6250; 6300; 6350; 6400; 6450; 6500; 6550; 6600; 6650; 6700; 6750; 6800; 6850; 6900; 6950; 7000; 7050; 7100; 7150; 7200; 7250; 7300; 7350; 7400; 7450; 7500; 7550; 7600; 7650; 7700; 7750; 7800; 7850; 7900; 7950; 8000; 8050; 8100; 8150; 8200; 8250; 8300; 8350; 8400; 8450; 8500; 8550; 8600; 8650; 8700; 8750; 8800; 8850; 8900; 8950; 9000; 9050; 9100; 9150; 9200; 9250; 9300; 9350; 9400; 9450; 9500; 9550; 9600; 9650; 9700; 9750; 9800; 9850; 9900; 9950; or 10000.

The coating composition can be an aqueous coating, a solvent-based coating, solventless coating, UV coating, Electron Beam coating, or powder coating which provides a film on the surface of PPG or PPG copolymer treated wood.

In other embodiments, the present invention provides wood products that have improved dimensional stability compared to an untreated wood product as measured by anti-swelling efficiency (ASE) and water exclusion efficiency (WEE). In certain embodiments, the improved dimensional stability of the treated wood or wood product is characterized by one or more of an improved anti-swelling efficiency (ASE) and/or water exclusion efficiency (WEE) compared to untreated wood. In another embodiment, the improved dimensional stability is characterized by either a process that produces wood or a wood product with one or more improved ASE or WEE compared to untreated wood or wood product or a process that produces wood or a wood product with a particular ASE or WEE. In another embodiment, the improved dimensional stability is characterized by either a process that produces wood or a wood product with one or more improved ASE or WEE compared to untreated wood or wood product or a process that produces wood or a wood product with a particular ASE or WEE according to the procedures of AWPA E4-11. Reference to the procedures of AWPA E4-11, which is incorporated by reference in its entirety herein, refers to either the specific procedures described therein used to determine ASE or the treatment and analytical procedures described therein as used to determine other parameters such as WEE. In yet another embodiment, the present invention provides wood or wood products produced according to any one of the disclosed methods.

In another embodiment, the improved dimensional stability is characterized by a process that produces wood or a wood product with an ASE of at least 80, 85, 90, 91, 92, 93, 94, 95, 96, 97, 98 or 99% according to the procedures of AWPA E4-11. In another embodiment, the improved dimensional stability is characterized by a process that produces wood or a wood product with an ASE of between at least about 80 to about 99%; 91 to about 99%; 92 to about 99%; 93 to about 99%; 94 to about 99%; 95 to about 99%; 96 to about 99%; 97 to about 99%; or 98 to about 99%, according to the procedures of AWPA E4-11.

In another embodiment, the improved dimensional stability is characterized by a process that produces wood or a wood product with a WEE of at least 90, 91, 92, 93, 94, 95, 96, 97, 98 or 99% according to the procedures of AWPA E4-11. In another embodiment, the improved dimensional stability is characterized by a process that produces wood or a wood product with a WEE of between at least about 90 to about 99%; 91 to about 99%; 92 to about 99%; 93 to about 99%; 94 to about 99%; 95 to about 99%; 96 to about 99%; 97 to about 99%; or 98 to about 99%, according to the procedures of AWPA E4-11.

The amount of PPG, a high molecular weight polyethylene glycol, a polyether polyol having low solubility in water, or a polytetrahydrofuran, or hydrophobic polyether polyol, impregnated in wood may be expressed as retention in pound per cubic foot (pcf). In another embodiment, the improved dimensional stability is characterized by a process that produces wood or a wood product with retention of about 5, 10, 15, 20, 25, 30, 35, 40, 45, 50, 60 pcf of PPG or PPG co-polymer, a high molecular weight polyethylene glycol, a polyether polyol having low solubility in water, or a polytetrahydrofuran, or hydrophobic polyether polyol, in wood.

DETAILED DESCRIPTION OF THE INVENTION

PPG polymers or copolymers can be used for treating wood to impart dimensional stabilization. In one embodiment, the treating step involves contacting the wood or wood product with a composition comprising PPG polymers or copolymers such that the wood or wood product is impregnated with the composition. Impregnation may be achieved by any one or more methods known in the art, including but not limited to pressure, vacuum, microwave or radio-frequency treatments. The temperature during the contacting step may vary from ambient temperature to elevated temperatures, such as above about 20° C., 30° C., 40° C., 50° C., 60° C., 70° C., 80° C., 90° C., 100° C., 110° C., 120° C., 130° C., 140° C. or 150° C. Compositions comprising PPG polymers or copolymers may be used alone or diluted with other solvents, such as alcohols and the like. In addition, PPG polymer and copolymer compositions may also be combined with a drying oil, including but not limited to linseed oil.

Polypropylene glycol (PPG) is the polymer of propylene oxide. It is also called polypropylene oxide, and belongs to the family of polyether. PPG is produced by ring-opening polymerization of propylene oxide with a base of acid as catalyst. The initiator can be an alcohol or a compound with multifunctional groups such as, glycerol (glycerine), pentaerythritol or sorbitol.

When the initiator is ethylene glycol or water, the polymer is linear with one or two terminal hydroxyl groups. The reaction is demonstrated below:

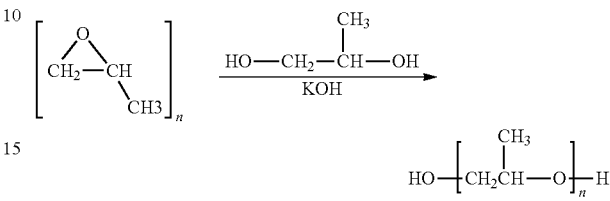

When the initiator has multifunctional group like glycerine, the PPG polymer branches out with three or more terminal hydroxyl groups. The reaction is demonstrated below with glycerin as the initiator:

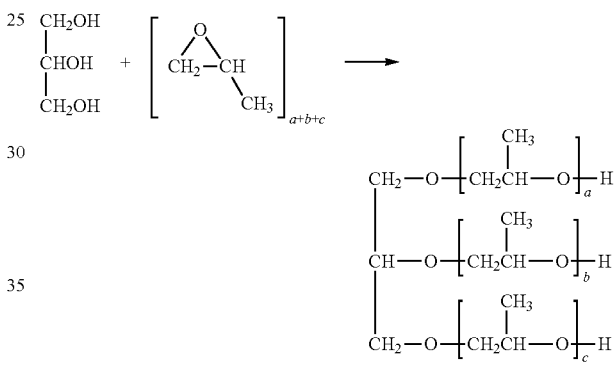

If the reaction contains two monomers, ethylene oxide and propylene oxide, for example, the reaction forms a polypropylene glycol/polyethylene glycol copolymer.

PPG or its copolymers are water soluble at low molecular weights, but PPG or its copolymers with molecular weights about 500 and higher are considered water insoluble or sparingly water soluble. At ambient temperature, they can be in liquid form or slightly waxy form or waxy form depending upon the molecular weight. The viscosity of the products can decrease significantly with the increase of the temperature. As used herein, "ambient temperature" means between about 15 and 25° C. A PPG and copolymers suitable for use in the methods of the present invention may be characterized by one or more of its average molecular weight, solubility in water, its effect on the dimensional stability of wood or a wood product. Specifically, in one embodiment, PPG and its copolymers have an average molecular weight of between at least 500 and 100,000; between at least 5,000 and 100,000; or between about at least 500 and 5,000. In certain embodiments, the average molecular weight of the polypropylene glycol is at least 2,000; 3,000; 4,000, 4,800; 5,000; 6,000; 7,000; 8,000 or 10,000. In another embodiment, the average molecular weight of the polypropylene glycol is less than about 5,000. In another embodiment, the PPG or copolymers suitable for use in the methods of the present invention are insoluble or sparingly soluble in water. In other embodiments, the PPG polymers and copolymers have a solubility in water no greater than about 0.5% weigh/weight or no greater than about 0.1% weight/weight at 25° C.

A PPG and copolymers, a high molecular weight polyethylene glycol, a polyether polyol having low solubility in water, or a polytetrahydrofuran, or hydrophobic polyether polyol, are suitable for use in the methods of the present invention if, for example, the composition comprising a PPG or its copolymers, a high molecular weight polyethylene glycol, a polyether polyol having low solubility in water, or a polytetrahydrofuran, or hydrophobic polyether polyol, improve the dimensional stability of wood or a wood product as determined by one or more parameters, such as ASE or WEE as compared to untreated wood or wood product. ASE or WEE may be determined by any method known in the art. ASE of wood or a wood product, for example, may be determined by several methods including but not limited to AWPA E4-11 or ASTM D4446/D4446M-13 (Standard Test Method for Anti-Swelling Effectiveness of Water-Repellent Formulations and Differential Swelling of Untreated Wood When Exposed to Liquid Water Environments). In some embodiments, the improved dimensional stability is characterized by a process that produces wood or a wood product with an ASE of at least 80, 85, 90, 91, 92, 93, 94, 95, 96, 97, 98 or 99%. In another embodiment, the ASE is determined according to the procedures of AWPA E4-11. In another embodiment, the improved dimensional stability is characterized by a process that produces wood or a wood product with an ASE of between at least about 90 to about 99%; 91 to about 99%; 92 to about 99%; 93 to about 99%; 94 to about 99%; 95 to about 99%; 96 to about 99%; 97 to about 99%; or 98 to about 99%, according to procedures known in the art or the procedures of AWPA E4-11.

In other embodiments, the improved dimensional stability is characterized by a process that produces wood or a wood product with a WEE of at least 90, 91, 92, 93, 94, 95, 96, 97, 98 or 99%. In another embodiment, the WEE is determined according to the procedures of AWPA E4-11. In another embodiment, the improved dimensional stability is characterized by a process that produces wood or a wood product with a WEE of between at least about 90 to about 99%; 91 to about 99%; 92 to about 99%; 93 to about 99%; 94 to about 99%; 95 to about 99%; 96 to about 99%; 97 to about 99%; or 98 to about 99%, according to procedures known in the art or the procedures of AWPA E4-11.

The amount of PPG, a high molecular weight polyethylene glycol, a polyether polyol having low solubility in water, or a polytetrahydrofuran, or hydrophobic polyether polyol, impregnated in wood may also be expressed as retention in pound per cubic foot (pcf). In another embodiment, the improved dimensional stability is characterized by a process that produces wood or a wood product with retention of about 5, 10, 15, 20, 25, 30, 35, 40, 45, 50, 60 pcf of PPG or PPG co-polymer, a high molecular weight polyethylene glycol, a polyether polyol having low solubility in water, or a polytetrahydrofuran, or hydrophobic polyether polyol, in wood.

The compositions comprising a PPG or copolymer, a high molecular weight polyethylene glycol, a polyether polyol having low solubility in water, or a polytetrahydrofuran, or hydrophobic polyether polyol, may be formulated as a concentrate or diluted with one or more carriers to produce a treating solution suitable for contacting the wood or wood product by any number of methods known in the art, including but not limited to impregnation by one or more vacuum, pressure, microwave or radio frequency treatments. The compositions suitable for use in the present invention may comprise PPG and/or a PPG copolymer, a high molecular weight polyethylene glycol, a polyether polyol having low solubility in water, or a polytetrahydrofuran, or hydrophobic polyether polyol, in a carrier comprising one or more solvents, co-solvents or liquids. The carrier can be an alcohol including but not limited to methanol, ethanol, propanol or isopropanol; a glycol including but not limited ethylene glycol, propylene glycol, di-propylene glycol or glycerol; a drying/semi-drying oils including but not limited to tung, corn, cottonseed, sesame, grape seed, linseed, poppy seed and walnut oil; an organic oil solvent including but not limited to mineral oil, white spirits, or other petroleum oils. The PPG or copolymer, a high molecular weight polyethylene glycol, a polyether polyol having low solubility in water, or a polytetrahydrofuran, or hydrophobic polyether polyol compositions, when formulated in a carrier for making treating solutions, may consist of PPG and/or a copolymer, a high molecular weight polyethylene glycol, a polyether polyol having low solubility in water, or a polytetrahydrofuran, or hydrophobic polyether polyol, in no more than 10%, 20%, 30%, 40%, 50%, 60%, 70%, 80% or 90% (volume/volume) of the solution.

The generalized structures of polyols used in the compositions provided herein are depicted below:

PEG Structure:

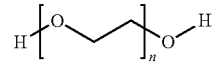

PPG Structure:

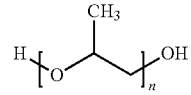

Poly (tetramethylene) glycol (PTMEG)

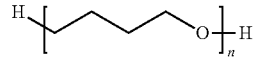

The treating fluid may be applied to wood by dipping, soaking, spraying, brushing, applying vacuum/pressure or microwave or any other means known in the art. In one preferred embodiment, vacuum and/or pressure techniques are used to impregnate the wood in accord with this invention including the standard processes, such as the "Empty Cell" process, the "Modified Full Cell" process and the "Full Cell" process, and any other vacuum and/or pressure processes which are well known to those skilled in the art. The standard processes are defined as described in AWPA Book of Standards, (American Wood Protection Association, (Birmingham, Ala.) (2013), which is incorporated herein by reference in its entirety. In the "Empty Cell" process, prior to the introduction of preservative, materials are subjected to atmospheric air pressure (Lowry) or to higher air pressures (Rueping) of the necessary intensity and duration. In the "Modified Full Cell" process, the initial vacuum used is lower than the final vacuum for the purpose of enhancing adequate kick back of the treating solution. The initial vacuum in this process is adjusted prior to the filling cycle to a level between atmosphere pressure and maximum vacuum. In the "Full Cell Process", the initial vacuum is not less than 77 kPa (22 inch Hg) for not less than 30 minutes before the cylinder is filled with preservative. Without breaking the vacuum the cylinder is filled with treating liquids and pressure is applied. After the pressure period, the cylinder is drained and a final vacuum may or may not be applied.

In another embodiment, the impregnate may be applied by a microwave or radio frequency treating process as described in U.S. Patent Application Publication No. 20130230668, which is incorporated herein by reference in its entirety. In this process, wood or wood products are first heated using a radio frequency or microwave energy. The temperature of the heated target zone can vary from 40° C. to 300° C., and more preferably 80° C. to 100° C. Immediately after the heating, a wood treatment composition is contacted with the substrate. The temperature of the liquid formulation is below that of the heated target zone at the time the composition is applied, the difference between the temperatures of the composition and the heated target zone being sufficient to reduce pressure in the substrate after the composition is applied. Various frequencies of radio or microwave energy may be used. The frequency of the radio frequency or microwave energy can vary from 0.1 MHz to 100 MHz, preferably between 10 and 50 MHz, a more preferably from 20 to 40 MHz. Skilled persons may readily appreciate appropriate wavelengths outside this range.

After treatment with a polypropylene glycol or copolymer, a high molecular weight polyethylene glycol, a polyether polyol having low solubility in water, or a polytetrahydrofuran, or hydrophobic polyether polyol, the surface of the wood or wood product may be further processed with agents or coatings. The agents or coatings may be reactive with hydroxyl groups of the PPG or PPG copolymer, a high molecular weight polyethylene glycol, a polyether polyol having low solubility in water, or a polytetrahydrofuran, or hydrophobic polyether polyol, such as isocyanate, polyisocyanate, blocked polyisocyanate, thermolatent isocyanate, amino formaldehyde resin, polyanhydride, epoxy resin and carboxylated resin to form chemical bonds. The agents or coatings may also be non-reactive with PPG or PPG copolymer, a high molecular weight polyethylene glycol, a polyether polyol having low solubility in water, or a polytetrahydrofuran, or hydrophobic polyether polyol, film forming resin/polymer such as polyester resins, vinyl ester resins, vinyl ester ethylene copolymers, acrylic resins, styrene/acrylic copolymers, styrene/butadiene copolymers and other synthetic and natural latexes; or crosslinking polymers such as epoxies, polyurea and polyurethanes. The coating composition may be an aqueous coating, a solvent-based coating, solventless coating, UV coating, Electron Beam coating, or powder coating which provides a film on the surface of PPG or PPG copolymer, a high molecular weight polyethylene glycol, a polyether polyol having low solubility in water, or a polytetrahydrofuran, or hydrophobic polyether polyol, treated wood.

Wood species that can be used in the methods and products of the invention include hard wood species as well as soft wood species, such as Southern Yellow Pine (SYP) or radiata pine.

The Examples listed below illustrate methods for preparing various compositions and using those compositions to treat wood or wood products according to the invention. The methods described in these Examples are illustrative only, and are not intended to limit the invention in any manner and should not be construed to limit the scope of claims herein.

EXAMPLES

Example 1

The dimensional stability of PPG treated wood was evaluated in the lab according to the American Wood Protection Association (AWPA) E4-11 evaluation protocol. PPG polymers with various molecular weights were used as treatment solutions. The average molecular weight of PPG ranges from 500 to 100,000. Generally, the treatments with lower molecular weight of less than 5,000 can be carried out at about temperature of 22-25° C. However, molecular weight of 5,000 or higher with high viscosity will require some degree of heating so that the temperature is maintained at 30 to 60° C. The details for the treating and testing are described as follows:

Wood Sample Preparation:

E-4 wood wafers measuring 6.4×25×50 mm (0.25×1×2") in the longitudinal, radial and tangential directions, respectively, were cut from clear, straight-grained and kiln-dried SYP sapwood boards.

Treating and Conditioning:

The E-4 wafers were treated with desired solutions (see Table 1, below) following the procedures described in AWPA Standard E4-03. Three E-4 wafers from three parent boards were evaluated for each treating solution. After treatment, E-4 wafers (one from each parent board) were dried and conditioned at 70° F. and RH of 65% until the weight of wafers reach constant.

Water Repellency Test:

Immediately after treating with PPG polymer and conditioning, the treated E-4 wafers were immersed in distilled water at room temperature for 30 minutes. The tangential swelling and the water absorption were measured. The anti-swelling efficiency (ASE) and the water exclusion efficiency (WEE) were calculated using the following equations:

$$ASE = \frac{S1 - S2}{S1} \times 100$$

Where: S1=Percent swelling of untreated control in tangential direction
S2=Percent swelling of treated specimen in tangential direction $$WEE = \frac{W1 - W2}{W1} \times 100$$

Where: W1=Percent of water absorbed by untreated control
W2=Percent of water absorbed by treated specimen For both ASE and WEE, a positive number indicates a degree of water repellency. The higher the number, the greater the water repellency of the treated specimens. A low number indicates poor water repellency.

Examples 2 to 11 in the following table (Table 1) lists the results from the treatment of Southern Yellow Pine wafers according to the methods of AWPA E4-11 (see Example 1) with PPG of various average molecular weights.

TABLE 1

| | Wood Treatment with Polypropylene Glycol (PPG) Having Various Molecular Weights | | | |
|---|---|---|---|---|
| Example | Name/Treatment | Average Molecular Weight | ASE (%) | WEE (%) |
| 2 | Polyglycol PT3000 | 3000 | 95.12 | 96.14 |
| 3 | Polyglycol PT3000 | 3000 | 97.82 | 97.67 |

TABLE 1-continued

Wood Treatment with Polypropylene Glycol
(PPG) Having Various Molecular Weights

| Example | Name/Treatment | Average Molecular Weight | ASE (%) | WEE (%) |
|---|---|---|---|---|
| 4 | Polyglycol PT3000 | 3000 | 97.67 | 97.68 |
| 5 | Polyglycol PT3000 | 3000 | 91.56 | 97.53 |
| 6 | Polyglycol PT4800 | 4800 | 94.41 | 96.09 |
| 7 | Polyglycol PT4800 | 4800 | 98.89 | 98.13 |
| 8 | Polyglycol PT4800 | 4800 | 97.61 | 98.43 |
| 9 | Polyglycol PT4800 | 4800 | 97.81 | 98.21 |
| 10 | Polyglycol PT2000 | 2000 | 98.42 | 97.35 |
| 11 | Polyglycol PT4000 | 4000 | 93.17 | 97.14 |

Example 12

The dimensional stability of PPG treated wood was evaluated in the lab according to the American Wood Protection Association (AWPA) E4-11 evaluation protocol. E-4 wood wafers measuring 6.4×25×50 mm (0.25×1×2") in the longitudinal, radial and tangential directions, respectively, were cut from clear, straight-grained and kiln-dried SYP sapwood boards. E4 wood wafers were pressure impregnated with a PPG with a molecular weight of 3000. After pressure treatment, one or more polyisocyanate compounds were applied to the surface of the treated wood wafers. The coated wafers were conditioned in the lab for a week prior to water repellency testing. The ASE and WEE measurements were carried out according to the procedures described in Example 1. The results are listed in Table 2.

Examples 12 to 15 in the Table 2 list the results from the treatment of Southern Yellow Pine wafers according to the methods of AWPA E4-11 with the treatment of PPG of various average molecular weights plus a surface application of a polyisocyanate compound.

TABLE 2

Wood Treatment with Polypropylene Glycol
(PPG) Having Various Molecular Weights

| Example | Name/Treatment | Average Molecular Weight | ASE (%) | WEE (%) |
|---|---|---|---|---|
| 12 | Polyglycol PT3000 | 3000 | 98.11 | 99.47 |
| 13 | Polyglycol PT4800 | 4800 | 94.78 | 98.94 |
| 14 | Polyglycol PT2000 | 2000 | 90.32 | 98.77 |
| 15 | Polyglycol PT4000 | 4000 | 96.77 | 99.30 |

Example 16

The dimensional stability of PTMEG treated wood was evaluated in the lab according to the American Wood Protection Association (AWPA) E4-11 evaluation protocol (see Example 1). The ASE and WEE measurements were carried out according to the procedures described in Example 1. The results are listed in Table 3.

Example 17

The dimensional stability of PTMEG treated wood was evaluated in the lab according to the American Wood Protection Association (AWPA) E4-11 evaluation protocol. E-4 wood wafers measuring 6.4×25×50 mm (0.25×1×2") in the longitudinal, radial and tangential directions, respectively, were cut from clear, straight-grained and kiln-dried SYP sapwood boards. E4 wood wafers were pressure impregnated with a PTMEG with a molecular weight of 250. After pressure treatment, one or more polyisocyanate compounds were applied to the surface of the treated wood wafers. The coated wafers were conditioned in the lab for a week prior to water repellency testing. The ASE and WEE measurements were carried out according to the procedures described in Example 1. The results are listed in Table 3.

TABLE 3

Wood Treatment with Polytetrahydrofuran
Having Various Molecular Weights

| Example | Name/Treatment | Average Molecular Weight | ASE (%) | WEE (%) |
|---|---|---|---|---|
| 16 | Terathane 250 | 250 | 99.69 | 98.19 |
| 17 | Terathane 250 | 250 | 99.50 | 99.01 |

What is claimed is:

1. A treated wood product comprising a composition consisting essentially of polypropylene glycol or a polypropylene glycol copolymer with an average molecular weight of between at least 500 and 100,000, wherein the treated wood product has a retention of at least 5 pounds per cubic foot (pcf) of the polypropylene glycol or a polypropylene glycol copolymer, and wherein the treated wood product has improved dimensional stability compared to an untreated wood product, and wherein the treated wood product is produced by a treatment process comprising pressure, vacuum, or microwave treatment.

2. The treated wood product of claim 1, wherein the average molecular weight of the polypropylene glycol or a polypropylene glycol copolymer is at least 2,000.

3. The treated wood product of claim 1, wherein the average molecular weight of the polypropylene glycol or a polypropylene glycol copolymer is at least 3,000.

4. The treated wood product of claim 1, wherein the average molecular weight of the polypropylene glycol or a polypropylene glycol copolymer is at least 4,000.

5. The treated wood product of claim 1, wherein the average molecular weight of the polypropylene glycol or a polypropylene glycol copolymer is at least 4,800.

6. The treated wood product of claim 1, wherein the average molecular weight of the polypropylene glycol or a polypropylene glycol copolymer is at least 5,000.

7. The treated wood product of claim 1, wherein the average molecular weight of the polypropylene glycol or a polypropylene glycol copolymer is at least 6,000.

8. The treated wood product of claim 1, wherein the average molecular weight of the polypropylene glycol or a polypropylene glycol copolymer is at least 7,000.

9. The treated wood product of claim 1, wherein the average molecular weight of the polypropylene glycol or a polypropylene glycol copolymer is at least 8,000.

10. The treated wood product of claim 1, wherein the average molecular weight of the polypropylene glycol or a polypropylene glycol copolymer is at least 10,000.

11. The treated wood product of claim 1, wherein the average molecular weight of the polypropylene glycol or a polypropylene glycol copolymer is less than about 5,000.

12. The treated wood product of claim 1, wherein polypropylene glycol or a polypropylene glycol copolymer has a solubility in water no greater than about 0.5% w/w at 25° C.

13. The treated wood product of claim 1, wherein the average molecular weight of the propylene glycol or a polypropylene glycol copolymer is between about 500 and 5,000.

14. The treated wood product of claim 1, wherein the treatment process comprises a temperature step of between about 20 and 60° C.

15. The treated wood product of claim 1, wherein the treatment process comprises a temperature step of between about 22 and 25° C.

16. The treated wood product of claim 1, wherein the average molecular weight of the propylene glycol or a polypropylene glycol copolymer is between about 5,000 and 100,000.

17. The treated wood product of claim 16, wherein the treatment process comprises a temperature step of at least about 30° C.

18. The treated wood product of claim 17, wherein the treatment process comprises a temperature step of between about 30° C. and 90° C.

19. The treated wood product of claim 1, wherein the composition consisting essentially of polypropylene glycol or a polypropylene glycol copolymer produces a wood product with an anti-swelling efficiency (ASE) of at least 90% according to the procedures of AWPA E4-11.

20. The treated wood product of claim 1, wherein the composition consisting essentially of polypropylene glycol or a polypropylene glycol copolymer produces a wood product with water exclusion efficiency (WEE) of at least 90% according to the procedures of AWPA E4-11.

21. The treated wood product of claim 1, wherein the treatment process comprises the step of treating the surface of the wood product with one or more agents or coatings.

22. The treated wood product of claim 21, wherein the agent comprises an isocyanate or polyisocyanate.

23. The treated wood product of claim 1, wherein the composition further comprises a carrier.

24. The treated wood product of claim 23, wherein the carrier comprises an alcohol, glycol, glycerol or oil.

25. The treated wood product of claim 24, wherein the oil is selected from the group consisting of tung, corn, cottonseed, sesame seed, grape seed, linseed, poppy seed and walnut oil.

26. The treated wood product of claim 25, wherein the oil is linseed oil.

27. A treated wood product comprising a composition consisting essentially of a polyether polyol having low solubility in water, wherein the treated wood product has a retention of at least 5 pounds per cubic foot (pcf) of the polyether polyol, and wherein the treated wood product has improved dimensional stability compared to an untreated wood product, and wherein the treated wood product is produced by a treatment process comprising pressure, vacuum, or microwave treatment.

28. A treated wood product comprising a composition consisting essentially of polypropylene glycol or a polypropylene glycol copolymer with an average molecular weight of between at least 500 and 100,000, wherein the treated wood product has a retention of at least 5 pounds per cubic foot (pcf) of the polypropylene glycol or a polypropylene glycol copolymer, and wherein the treated wood product has improved dimensional stability compared to an untreated wood product.

29. A treated wood product comprising a composition consisting essentially of a polyether polyol having low solubility in water, wherein the treated wood product has a retention of at least 5 pounds per cubic foot (pcf) of the polyether polyol, and wherein the treated wood product has improved dimensional stability compared to an untreated wood product.

30. The treated wood product of claim 1, wherein the treated wood product has a retention of at least 10 pounds per cubic foot (pcf) of said polypropylene glycol or a polypropylene glycol copolymer.

31. The treated wood product of claim 1, wherein the treated wood product has a retention of at least 15 pounds per cubic foot (pcf) of said polypropylene glycol or a polypropylene glycol copolymer.

32. The treated wood product of claim 1, wherein the treated wood product has a retention of at least 20 pounds per cubic foot (pcf) of said polypropylene glycol or a polypropylene glycol copolymer.

33. The treated wood product of claim 1, wherein the treated wood product has a retention of at least 25 pounds per cubic foot (pcf) of said polypropylene glycol or a polypropylene glycol copolymer.

34. The treated wood product of claim 1, wherein the treated wood product has a retention of at least 30 pounds per cubic foot (pcf) of said polypropylene glycol or a polypropylene glycol copolymer.

35. The treated wood product of claim 1, wherein the treated wood product has a retention of at least 35 pounds per cubic foot (pcf) of said polypropylene glycol or a polypropylene glycol copolymer.

36. The treated wood product of claim 1, wherein the treated wood product has a retention of at least 40 pounds per cubic foot (pcf) of said polypropylene glycol or a polypropylene glycol copolymer.

37. The treated wood product of claim 27, wherein the treated wood product has a retention of at least 10 pounds per cubic foot (pcf) of said polyether polyol.

38. The treated wood product of claim 27, wherein the treated wood product has a retention of at least 15 pounds per cubic foot (pcf) of said polyether polyol.

39. The treated wood product of claim 27, wherein the treated wood product has a retention of at least 20 pounds per cubic foot (pcf) of said polyether polyol.

40. The treated wood product of claim 27, wherein the treated wood product has a retention of at least 25 pounds per cubic foot (pcf) of said polyether polyol.

41. The treated wood product of claim 27, wherein the treated wood product has a retention of at least 30 pounds per cubic foot (pcf) of said polyether polyol.

42. The treated wood product of claim 27, wherein the treated wood product has a retention of at least 35 pounds per cubic foot (pcf) of said polyether polyol.

43. The treated wood product of claim 27, wherein the treated wood product has a retention of at least 40 pounds per cubic foot (pcf) of said polyether polyol.

44. The treated wood product of claim 28, wherein the treated wood product has a retention of at least 10 pounds per cubic foot (pcf) of said polypropylene glycol or a polypropylene glycol copolymer.

45. The treated wood product of claim 28, wherein the treated wood product has a retention of at least 15 pounds per cubic foot (pcf) of said polypropylene glycol or a polypropylene glycol copolymer.

46. The treated wood product of claim 28, wherein the treated wood product has a retention of at least 20 pounds per cubic foot (pet) of said polypropylene glycol or a polypropylene glycol copolymer.

47. The treated wood product of claim 28, wherein the treated wood product has a retention of at least 25 per cubic foot (pcf) of said polypropylene glycol or a polypropylene glycol copolymer.

48. The treated wood product of claim 28, wherein the treated wood product has a retention of at least 30 pounds per cubic foot (pcf) of said polypropylene glycol or a polypropylene glycol copolymer.

49. The treated wood product of claim 28, wherein the treated wood product has a retention of at least 35 pounds per cubic foot (pcf) of said polypropylene glycol or a polypropylene glycol copolymer.

50. The treated wood product of claim 28, wherein the treated wood product has a retention of at least 40 pounds per cubic foot (pcf) of said polypropylene glycol or a polypropylene glycol copolymer.

51. The treated wood product of claim 29, wherein the treated wood product has a retention of at least 10 pounds per cubic foot (pcf) of said polyether polyol.

52. The treated wood product of claim 29, wherein the treated wood product has a retention of at least 15 pounds per cubic foot (pcf) of said polyether polyol.

53. The treated wood product of claim 29, wherein the treated wood product has a retention of at least 20 pounds per cubic foot (pcf) of said polyether polyol.

54. The treated wood product of claim 29, wherein the treated wood product has a retention of at least 25 pounds per cubic foot (pcf) of said polyether polyol.

55. The treated wood product of claim 29, wherein the treated wood product has a retention of at least 30 pounds per cubic foot (pcf) of said polyether polyol.

56. The treated wood product of claim 29, wherein the treated wood product has a retention of at least 35 pounds per cubic foot (pcf) of said polyether polyol.

57. The treated wood product of claim 29, wherein the treated wood product has a retention of at least 40 pounds per cubic foot (pcf) of said polyether polyol.

* * * * *